United States Patent [19]
Depew

[11] 3,716,278
[45] Feb. 13, 1973

[54] LIQUID BEARING
[75] Inventor: George N. Depew, Reseda, Calif.
[73] Assignee: The United States of America as represented by the Secretary of the Army
[22] Filed: March 25, 1971
[21] Appl. No.: 127,869

[52] U.S. Cl. .................................................308/9
[51] Int. Cl. ...........................................F16c 17/06
[58] Field of Search...........................................308/9

[56] References Cited

UNITED STATES PATENTS 1,129,409  2/1915  Ljungstrom ............................308/9

FOREIGN PATENTS OR APPLICATIONS 50,922  1/1919  Sweden ..............................308/160

Primary Examiner—Milton Kaufman
Assistant Examiner—Frank Susko
Attorney—Harry M. Saragovitz et al.

[57] ABSTRACT

A liquid thrust bearing has provision for minimizing leakage, automatically returning leakage to a reservoir, and automatically restoring any lost fluid to the pressure/thrust area each time the thrust is removed.

5 Claims, 3 Drawing Figures

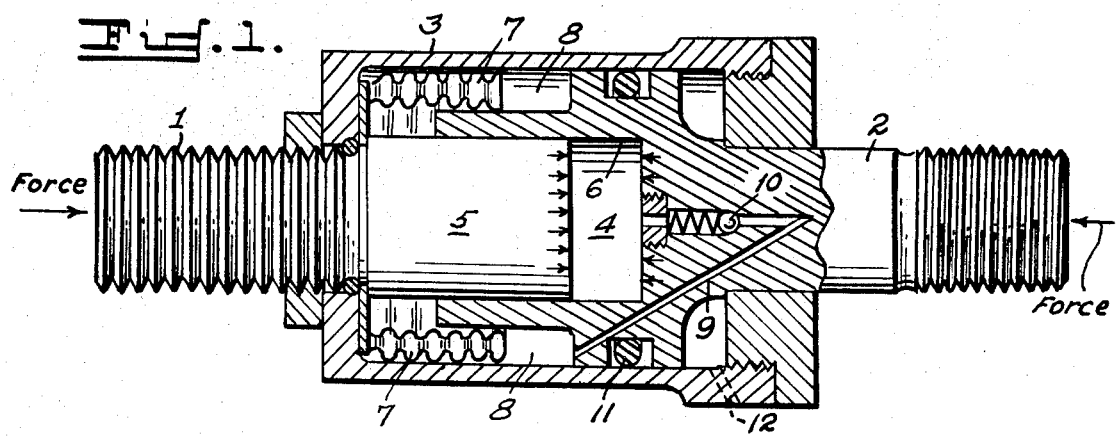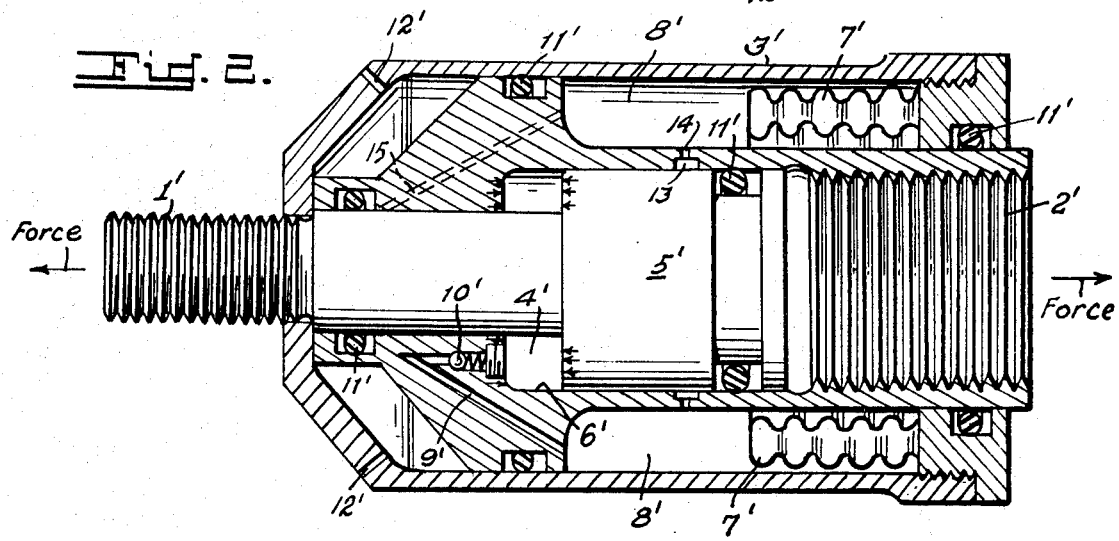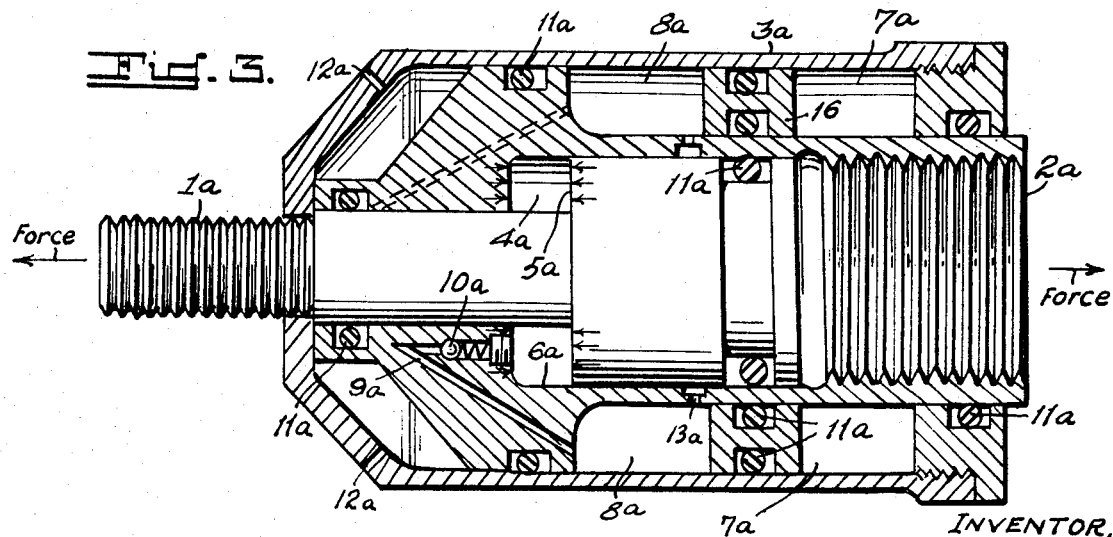

LIQUID BEARING

The invention described herein may be manufactured, used, and licensed by or for the Government for governmental purposes without the payment to me of any royalty thereon.

BRIEF SUMMARY

Axial thrust bearings are used in many places to resist forces applied along an axis or axle. These forces may be in compression or may be in tension. Ball bearings, tapered roller bearings and liquid (or gas) thrust bearings are known. Liquid (or gas) thrust bearings are somewhat more difficult to employ especially if used in certain environments. It is difficult to keep a seal absolutely liquid-tight over a period of years. And, if the seal is not absolutely liquid-tight, the leaky fluid (oil) is messy, the reserve is depleted sooner-or-later, and the effective length of the bearing is changed as the fluid in the pressure/thrust chamber leaks out. The prime advantage of the liquid (fluid) bearing is lost when the virtually frictionless liquid escapes and allows metal-to-metal contact between the piston and the cylinder.

The present invention solves some of the problems related to liquid (or gas) thrust bearings by minimizing or preventing escape of fluid from the overall system and by automatically returning fluid leaked from the high-pressure thrust chamber back to that high-pressure chamber during periods of low thrust.

Other advantages will become apparent to those skilled in the art.

IN THE DRAWING

FIG. 1 illustrates the invention in a compression thrust bearing;

FIG. 2 illustrates the invention in a tension thrust bearing;

FIG. 3 illustrates a modification of the tension thrust bearing.

In FIG. 1 forces are applied to members 1 and 2 to place thrust bearing 3 in compression. Fluid in pressure/thrust chamber 4 is trapped between piston 5 and cylinder 6.

Bellows 4. preferably contains pressurized gas acting on fluid in reservoir chamber 8. Passage 9 and check valve 10 permit one-way flow of fluid from chamber 8 to chamber 7.

In the embodiment of FIG. 1 O-ring seal 11 is intended to prevent leakage from chamber 8. Vent 12 permits "breathing" at the right end of the cylinder-piston. If leakage should occur past the O-ring the fluid can escape through vent 12.

OPERATION (FIG. 1) An example of operation of the thrust bearing 3 will illustrate its utility. A pressurized gas at, say 500 psi, in bellows 7 exerts a similar pressure on fluid (liquid or gas) in reservoir chamber 8, passage 9 and pressure/thrust chamber 4. Assuming piston 5 to have a cross-sectional area of 1 square inch members 1 and 2 are forced apart with a force of 500 pounds. Assume member 1 to be held stationary and member 2 to be rotatable, it is obvious that high forces (above 500 pounds) cause a slight compression of the fluid in chamber 4 (a very slight compression if the fluid is liquid). Member 2 and cylinder 6 move slightly to the left and member 2 can spin substantially freely, with the fluid offering very little resistance.

During periods of high pressure, a slight amount of fluid may escape from chamber 4 along cylinder-piston walls 5, 6. However, it merely leaks into chamber 8 against the lower pressure (500 psi) in chamber 8. Then, when force is removed from member 2, the 500 psi exerted by bellows 7 automatically forces make-up fluid from reservoir chamber 8 through passage 9 and check valve 10 to pressure/thrust chamber 4. When the force on member 2 is removed pressure from bellows 7, acting on fluid in reservoir 8, through passage 9, returns member 2 to its outermost position ready to receive another load.

In FIG. 2 the action is similar but the bearing 3' is a tension thrust bearing, with forces on members 1' and 2' being exerted outwardly. Helicopter rotor blades may use this embodiment to absorb centrifugal forces exerted outwardly by the whirling blades while permitting adjustment for greater pitch. Each time the helicopter rotor stops the tension thrust is relieved to permit the automatic fluid restoration in the pressure/thrust chamber. Fluid trapped in annular pressure/thrust chamber 4' resists movement of cylinder 6' and force member 2' outwardly relative to piston 5' and force member 1'. If fluid leaks between piston 5' and cylinder 6', it flows into groove 13 and through bleed ports 14 back to reservoir 8'. When the outward force is removed from members 1' and 2' pressure in bellows 7' acts on fluid in reservoir 8' forcing the fluid through passage 9' and check valve 10' to pressure chamber 4'. This restores the fluid leaked through passages 14 back to pressure chamber 4' and pushes piston 5' and cylinder 6' further apart, ready for another tension load.

Conventional O-ring seals are illustrated at 11' at various locations.

If fluid leaks outwardly along force member 1', it is stopped by an O-ring 11' and returns through passage 15 to reservoir 8'. Vent passages 12' permit "breathing" or drainage if any fluid should leak past the O-ring seal.

In FIG. 3 thrust bearing 3a is in tension similar to FIG. 2. In stead of using a sealed bellows the chamber 7a is sealed. A compressible gas, under pressure, exerts a force against annular seal (piston) 16. (Reference numeral 11a is used to designate typical O-ring seals at several places in FIG. 3. Their function is well understood to those skilled in the art.)

I claim:

1. A fluid thrust bearing comprising a housing, a pair of thrust members to receive axial thrust, a fluid-filled pressure/thrust chamber to receive axial thrust exerted by said pair of thrust members, a fluid reservoir, passage means interconnecting the thrust chamber and reservoir, a check valve in said passage means preventing fluid flow from said thrust chamber during high pressure periods but permitting fluid flow from said reservoir to said thrust chamber, and pressure means to urge fluid from said reservoir to said thrust chamber during low pressure periods in said thrust chamber, said pressure means to urge fluid from said reservoir to said thrust chamber comprising a bellows containing compressed gas acting to expand said bellows to thereby exert pressure on fluid in said reservoir to force said fluid into said pressure/thrust chamber during low pressure periods in said thrust chamber.

2. Apparatus as in claim 1 wherein said pressure/thrust chamber comprises a piston and a cylinder operatively connected to said pair of thrust members and acting to resist inward forces on said thrust members.

3. Apparatus as in claim 1 wherein said pressure/thrust chamber comprises a piston and a cylinder operatively connected to said pair of thrust members and acting to resist outward forces on said thrust members.

4. A fluid thrust bearing comprising a housing, a pair of thrust members to receive axial thrust, a fluid-filled pressure/thrust chamber to receive axial thrust exerted by said pair of thrust members, a fluid reservoir, passage means interconnecting the thrust chamber and reservoir, a check valve in said passage means preventing fluid flow from said thrust chamber during high pressure periods but permitting fluid flow from said reservoir to said thrust chamber, pressure means to urge fluid from said reservoir to said thrust chamber during low pressure periods in said thrust chamber, and fluid passage means for fluid that may leak from said pressure/thrust chamber to return the fluid to said reservoir.

5. Apparatus as in claim 4 wherein said pressure means comprises a sealed pressure chamber closed by an annular seal acting on fluid in said reservoir.

* * * * *